US007813999B2

(12) United States Patent
Lipper

(10) Patent No.: US 7,813,999 B2
(45) Date of Patent: Oct. 12, 2010

(54) FAIR REVENUE PARTICIPATION CONTRACTS AND EXCHANGE

(75) Inventor: Arthur Lipper, Del Mar, CA (US)

(73) Assignee: Sinipco Pte Ltd, Singapore (SG)

( * ) Notice: Subject to any disclaimer, the term of this patent is extended or adjusted under 35 U.S.C. 154(b) by 259 days.

(21) Appl. No.: 11/820,180

(22) Filed: Jun. 18, 2007

(65) Prior Publication Data

US 2008/0109344 A1 May 8, 2008

Related U.S. Application Data

(60) Provisional application No. 60/814,305, filed on Jun. 16, 2006.

(51) Int. Cl.
*G06Q 40/00* (2006.01)
(52) U.S. Cl. ........................................................ 705/37
(58) Field of Classification Search .................... 705/37
See application file for complete search history.

(56) References Cited

U.S. PATENT DOCUMENTS

| 7,149,719 | B2* | 12/2006 | Schulman ..................... 705/37 |
| 7,340,431 | B1* | 3/2008 | McManus et al. ............. 705/37 |
| 2004/0138977 | A1* | 7/2004 | Tomkins et al. ............... 705/36 |
| 2006/0100950 | A1* | 5/2006 | Hecht ........................... 705/37 |
| 2006/0112005 | A1* | 5/2006 | Priore .......................... 705/39 |
| 2007/0136180 | A1* | 6/2007 | Salomon et al. ............... 705/37 |

OTHER PUBLICATIONS

Brain, Marshall. "How Stocks and the Stock Market Work." Apr. 1, 2000. HowStuffWorks.com. <http://money.howstuffworks.com/personal-finance/financial-planning/stock.htm> Apr. 26, 2009.*
"The Manitoba Securities Commission." Sep. 2004. <http://www.msc.gov.mb.ca/securities/registration/requirements/underwriter.html> Apr. 26, 2009.*

* cited by examiner

*Primary Examiner*—Stefanos Karmis
*Assistant Examiner*—Jessica L Lemieux
(74) *Attorney, Agent, or Firm*—Ober, Kaler, Grimes & Shriver; Royal W. Craig

(57) ABSTRACT

A new class of investment instruments, Fair Revenue Participation Contracts (FRPC), and Redeemable Revenue Participation Contracts (RRPC), that allows investors to participate in revenue rather than profits. The FRPC gives the investor rights to the revenues of an issuing company, it being structured as a promise to pay X % of revenues for Y number of years. An exchange for trading in the FRPCs is also disclosed, and this includes, where necessary, a government regulating body (GRB) for regulation and a screen-based trading (SBT) system which may be owned and operated by the Authorized Trading Members (ATMs), said ATMs being pre-qualified by said GRB, the ATMS effectively owning the exchange and holding seats therein, and serving alternately as buyer agents, seller agents, and underwriters for transactions in the FRPCs.

3 Claims, 2 Drawing Sheets

FAIR REVENUE PARTICIPATION CONTRACTS AND EXCHANGE

CROSS-REFERENCE TO RELATED APPLICATION(S)

The present application derives priority from U.S. Provisional Application No. 60/814,305 filed Jun. 16, 2006.

DESCRIPTION OF THE INVENTION

1. Field of the Invention

The present invention relates to establishing a new class of investment instrument, neither equity nor debt, but rather a contractual right to participate in the revenue of a company, and a method for providing investors with liquidity through an exchange system facilitating the trading in said investment instruments.

2. Background of the Invention

A "security" may be broadly defined as an investment instrument, other than an insurance policy or fixed annuity, issued by a corporation, government, or other organization which offers evidence of debt or equity. There are many different types of securities and many exchanges worldwide for trading in them.

Currently, the only way for typical investors to participate in the growth of a given company is to purchase equity securities in that company. An equity security is an instrument that signifies an ownership position in a corporation and represents a claim on its proportional share in the corporation's assets and profits. For example, if a company has 100 shares of stock outstanding and a person owns 10 of them, then he/she owns 10% of the company. In addition to a claim on a share of corporate assets and profits, most stock also provides proportional voting rights in certain corporate decisions.

Investors may also purchase debt securities. Unlike equity securities, debt securities do not represent any ownership in the company but are simply a promise by the company to repay the face value of the security plus an additional amount called interest. Essentially, the company borrows from the investor in exchange for the security. Because they lack an ownership interest, debt securities do not allow the investor to participate in the growth of a company. Some debt securities may be converted to equity securities or may contain terms allowing the issuer to redeem the debt before its original term has expired.

For many reasons, simple debt and equity securities are not always viable or attractive investment options for all parties. Many entrepreneurs seeking to raise capital for their corporate venture are reluctant to share ownership in the company by selling equity securities or to disclose profitability figures for competitive or other reasons. At the same time, early stage companies are not generally able to issue debt securities (borrow) on favorable terms unless the loans are guaranteed. Loan guarantors frequently require fees and other inducements to accept the risk of default by the new company which, for closely held corporations, come often in the form of a personal guarantee by the entrepreneur owners. Many entrepreneurs are unwilling to encumber their personal assets (which means risking the family home).

Still, new ventures need funding. Investors with available capital want to own a portion of the company so as to share in and benefits of the anticipated growth. Lenders want security for the capital they are lending. In many instances neither option satisfies the needs and desires of the corporation and the investor. What is needed is an investment instrument that more effectively satisfies the entrepreneur's desire for retaining his equity and the investor's desire for a return on his investment.

Additionally, debt and equity securities are not always acceptable for cultural or religious reasons. Under Sharia law, which is derived from the teachings of the Quran and from Sunna (the practice of the Prophet Mohammed) and which is implemented to varying degrees in Islamic countries, followers are prohibited from involvement in certain industries and business practices. Notably, while trade and investment are encouraged, Sharia rules prohibit the receipt or payment of interest. These limitations are driving Islamic institutional investors in Middle East capital markets to alternative investment products and their practices are carrying over into European and U.S markets. Only financial vehicles that meet strict Sharia criteria and that are approved by internationally recognized Islamic scholars are available to these investors.

Some Sharia-compliant financial products currently exist. However, these products, typically selective mutual funds, are not normally sold on exchanges due to difficulties in engaging and compensating financial institutions and professionals for distributing and selling the product. As a result, Sharia-compliant financial products and other non-traditional investment instruments have not been effectively distributed through initial public offerings ("IPO's"). Broker-Dealer financial product support, service and coverage is lacking because the non-traditional products are not profitable for financial institutions when compared to more common financial instruments.

No one has yet been able to devise an investment instrument and exchange or other trading platform capable of Sharia-compliant certification and still able to take full advantage of an investment syndicate and wherein the inclusion of an underwriting discount or commission in the price of the investment instruments does not significantly damage or alter the relationship between the price of the instruments and their face value. This makes it difficult for many emerging family and privately-owned companies to find growth capital. A system and method that addresses the above concerns is presented herein.

SUMMARY OF THE INVENTION

It is, therefore, an object of the present invention to provide a new class of investment instrument, neither equity nor debt, but a Fair Revenue Participation Contract ("FRPC").

It is another object to provide a Sharia compliant investment product that allows investors to participate in revenue rather than profits. The revenue focus is additionally attractive to companies which do not wish to disclose profitability for competitive reasons and it gives them access to capital without suffering equity dilution or debt.

It is another object of the invention to provide a market on which FRPC Units may be freely bought and sold among investors so as to provide liquidity to the investment.

According to the present invention the above described and other objects are accomplished through creation of a binding contractual relationship between an investor and a company, freely assignable by the investor, whereby the company pledges to pay an agreed upon percentage of revenues to the investor for an agreed upon length of time in exchange for payment by the investor to the company of an agreed to amount of money. Periodic payments by the company to the investor are secured by certain identified assets of the company. The contract is sold to an investor on the primary market by underwriters who negotiate the terms of the agreement. The investor may sell his right to the benefits of ownership on a secondary market by assignment. The secondary market provides liquidity to the investor and is created and operated by its trading members.

The above described contract, coined a Fair Revenue Participation Contract (or "FRPC") is designed to be traded in Units which are freely assignable by the investor. Each Unit may be evidenced by a certificate or may be script-less, to allow trading without a physical certificate. The investor's interest in revenue based payments may be secured by assets of the company.

The precise terms of the contract may be modified somewhat to meet the needs of a particular circumstance. For example, a company may retain the right to redeem an FRPC prior to the expiration of the original term. An FRPC carrying such term would be referred to as a Redeemable Revenue Participation Contract (or "RRPC") and may be treated by the issuer as debt or contingent debt.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a Fair Revenue Participation Contract (FRPC) that allows investors to participate in the revenue of a company rather than profits and which can be qualified as Sharia compliant. The FRPC investment instrument is intended to give fledgling and privately held companies access to capital without diluting equity, taking on debt at unfavorable terms or publicly disclosing profitability figures. The instrument also allows larger and/or publicly traded companies to access capital by tying investor returns to revenue derived from certain projects. From the investor's perspective the FRPC is attractive because it provides returns based on the success of the company while avoiding the uncertainty of returns based on calculated profits and because it lends itself to active trading on a public exchange. An exchange format facilitating secondary market trading in FRPC's is also disclosed.

More specifically, the FRPC is a contractual right purchased by an investor to receive a fixed percentage of a company's revenue for a fixed length of time. The FRPC is structured as a promise to pay the investor X % of revenues for Y number of years.

Figure 1:
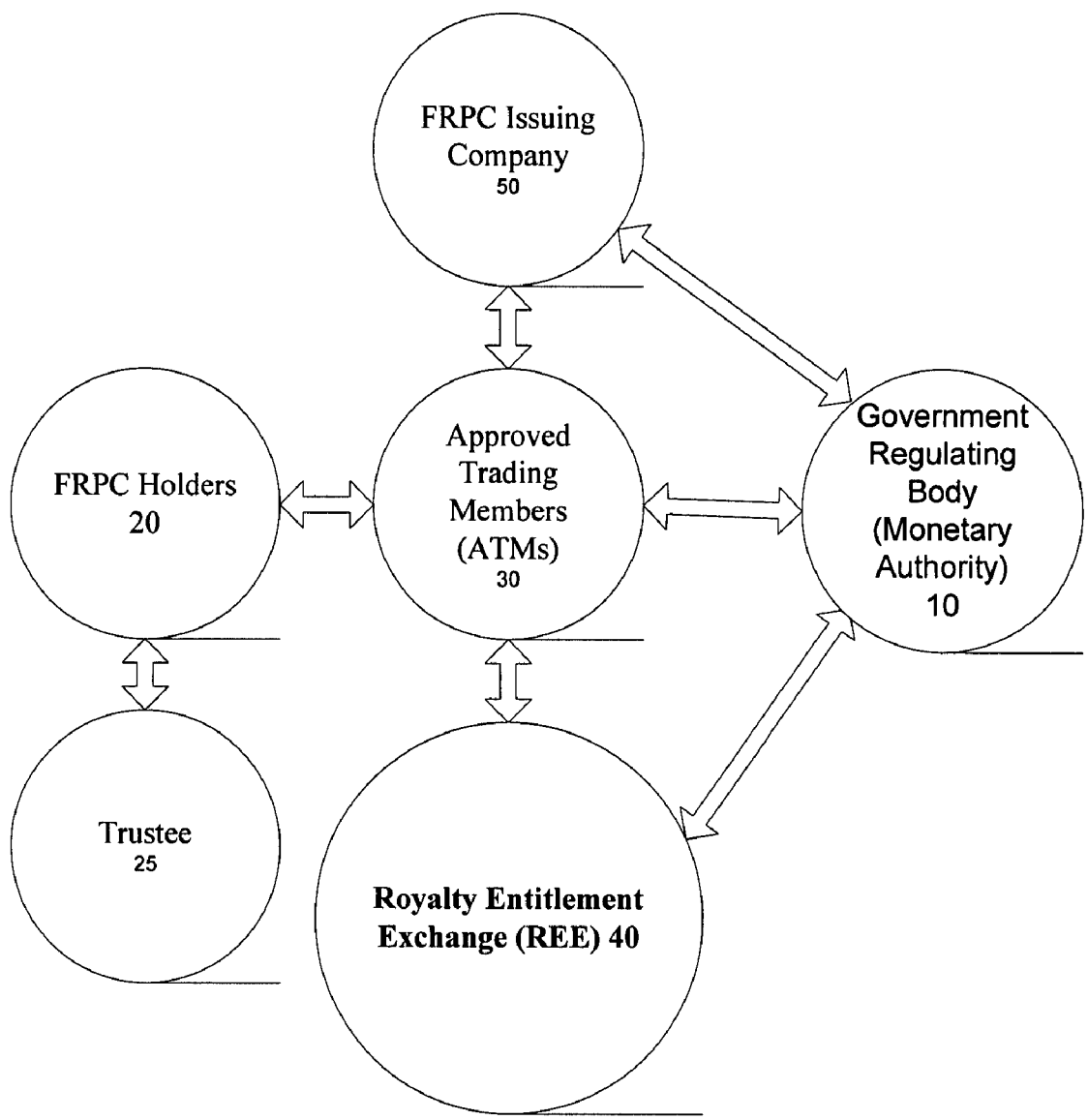
FIG. 1 is a diagram of the exchange format inclusive of the principal participants according to a preferred embodiment of the present invention.

FIG. 1 is a diagram of the exchange format inclusive of the principal participants, which include the investors (FRPC Holders 20), Approved Trading Members (ATMs 30), a Government Regulating Body (GRB) for regulating the exchange, the FRPC Issuing Company 50, and the Royalty Entitlement Exchange (REE) 40 itself.

Figure 2:
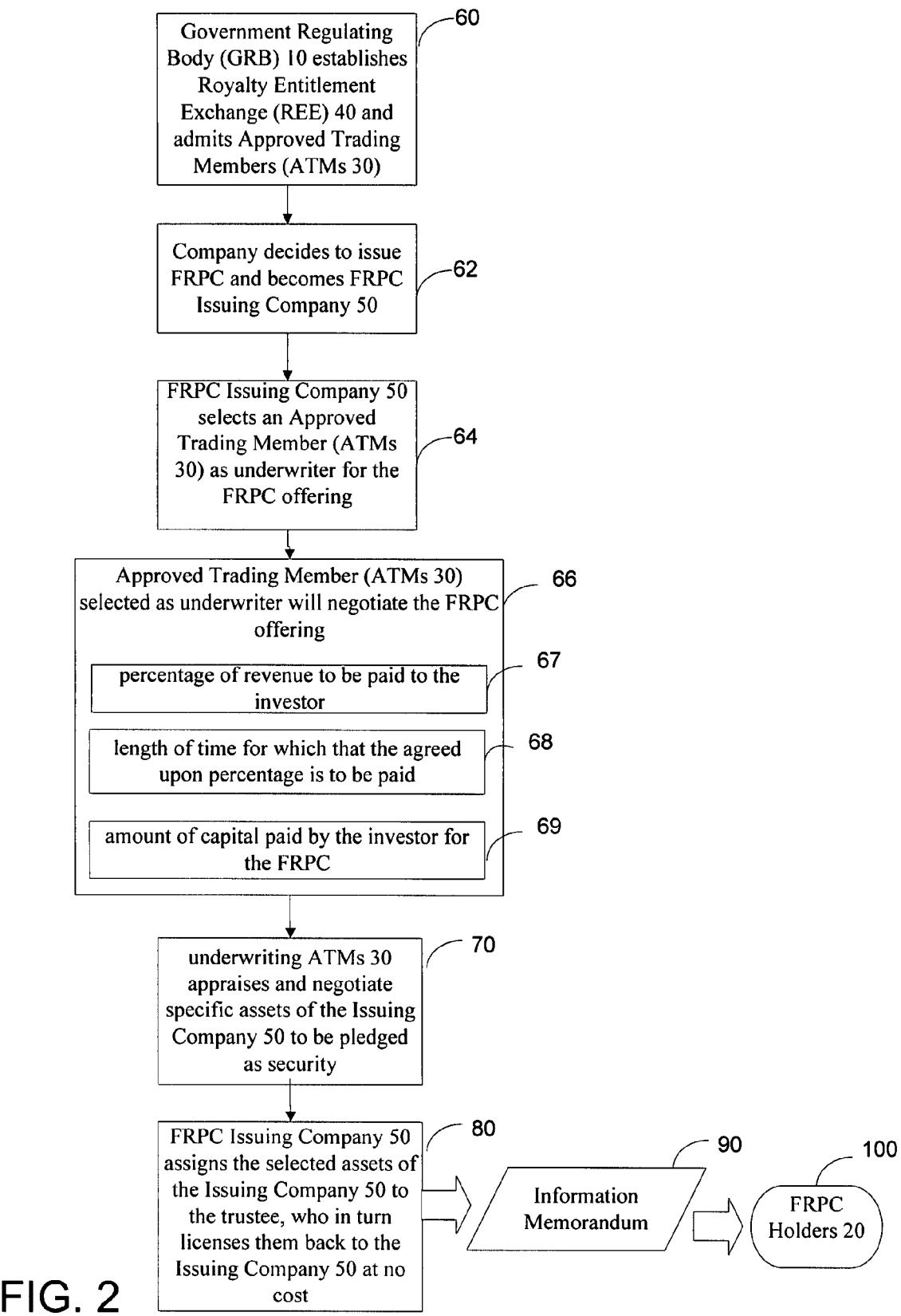
FIG. 2 is a flow chart illustrating the method steps by which the principal participants establish the exchange, an exemplary FRPC, and begin trading.

FIG. 2 is a flow chart illustrating the method steps by which the principal participants establish the exchange, an exemplary FRPC, and begin trading.

With combined reference to FIGS. 1 and 2, at step 60 a Government Regulating Body (GRB) 10 such as a monetary authority establishes the Royalty Entitlement Exchange (REX) 40 by implementing regulations governing the exchange and by admitting Approved Trading Members (ATMs 30).

Given the Royalty Entitlement Exchange (REX) 40, at step 62 any company may decide to take advantage of the FRPC option for securing capital and become an FRPC Issuing company 50.

At step 64 the FRPC Issuing company 50 will approach and select an Approved Trading Member (ATMs 30) to serve as an underwriter to market their FRPCs to individual investors.

At step 66, the Approved Trading Member (ATMs 30) selected as underwriter will negotiate the FRPC offering with the FRPC Issuing company 50. There are three things that must be negotiated during an initial offering of an FRPC: the percentage of revenue to be paid to the investor; (2) the length of time for which that the agreed upon percentage is to be paid; and (3) the amount of capital paid by the investor for the FRPC. In operation, these terms are negotiated between the FRPC Issuing Company 50 and the selected ATM(s) 30 who act as underwriters to market the FRPC to individual investors. The ATM 30 underwriters are pre-qualified in accordance with the regulations promulgated by the Government Regulating Body.

The negotiation of these three terms is detailed in sub steps 67-69. The percentage of revenue to be paid to the investor (sub step 67, as well as the length of time for which that the agreed upon percentage is to be paid (sub step 68) are decided by mutual agreement, and then at sub step 69 the ATMs 30 will recommend a par value of the FRPC based on the foregoing terms negotiated with the FRPC Issuing Company 50 (for example, US$10,000 in initial face value per FRPC Unit).

At step 70 the underwriting ATMs 30 also appraise and negotiate specific critical assets of the Issuing Company 50 to be pledged as security to a trustee company for the due performance by the Issuer of its payment obligations under the FRPC.

At step 80 the FRPC Issuing Company 50 assigns the selected assets of the Issuing Company 50 to the trustee, who in turn licenses them back to the Issuing Company 50 at no cost. In this way the FRPC is secured by specific assets of the company which can be sold by the trustee to cover the FRPC obligation in the event of default. At expiry of the FRPC revenue participation period or early redemption, the assets are transferred back to the issuing company 50 at no cost.

At step 90, the ATM(s) 30 who underwrite the initial sale of FRPCs are responsible for the preparation of an Information Memorandum similar to securities.

Finally, at step 100 the ATM(s) 30 procure investors to purchase the Issuing Company's 50 underwritten FRPC contractual units, the investors thereby becoming FRPC Holders 20. The FRPC Holders 20 purchase FRPC contractual units, each unit representing $10,000 in initial value. FRPC contractual Units may be issued as physical FRPC certificates representing each contractual unit held. Where such is the case, the physical FRPC certificates can be held by a depository in a standard manner to effectuate secondary trading through a book entry mechanism. An FRPC "Certificate" may also be issued in a script-less form to allow trading without the transfer of a physical certificate.

After the initial placement of FRPC units with FRPC Holders 20 by ATM(s) 30, all FRPC contractual units become subject to secondary trading on the Royalty Entitlement Exchange 40 or through other trading platforms. The Royalty Entitlement Exchange 40 permits any qualified ATM 30 to serve as a buyer's and/or seller's agent to facilitate the transaction. A screen based trading (SBT) system is employed for transparency and ease of use, and FRPC shares may be freely traded between buyer ATMs 30 and seller ATMs 30 on behalf of their clients. Following each trade, the ATM 30 acting on behalf of the seller is responsible for procuring written assignment of the FRPC from the seller and giving notice of the assignment to the Issuing Company 50 (or its agent).

As will be described, the FRPC investment instrument and the exchange platform is readily capable of Sharia-compliant certification, yet unlike other Sharia-compliant instruments, it takes full advantage of an investment syndicate in which the inclusion of an underwriting discount or commission does not unduly damage the relationship between the price of the instruments and their face value. This promotes an entirely new form of capital market and makes it much easier for emerging and privately-owned companies to find growth capital. Each component of the FRPC instrument and exchange is described in more detail below.

1. The Fair Revenue Participation Contract (FRPC).

Each FRPC is a written contract under which an Issuing Company 50 agrees to pay a specified percentage of its revenue (as distinct from profits) over a specified period of time to investors who have purchased FRPC revenue participation rights from it, or their assignees (the FRPC Holders 20). The term "Revenue" is strictly defined as the gross amount of income received by the Issuing Company 50, its subsidiaries, affiliates and related parties (collectively, the Group) for the sale of goods and services in respect of all their commercial activities.

The FRPC investment instrument can and will be certified as Sharia-compliant by internationally recognized Islamic scholars. Such Sharia compliant FRCP's, referred to as SFRCP's, must comply with the following conditions:

The Group does not carry on any activities prohibited under Sharia law (such as gambling, liquor production or sale, money lending, etc.);

there is no payment of interest to the SFRPC holders 20; and there is sharing of risk and reward. This is inherent inasmuch as the more successful the Issuing Company 50 the greater the benefit to the SFRPC Holder 20. Conversely, the FRPC Holder 20 is hurt when the company fails to achieve anticipated revenues. Although a fixed percentage of revenue will be payable, the absolute amount will vary according to the actual revenue achieved in the relevant period The following is a general summary of the main terms and conditions of the FRPC to be issued by the Issuing Company 50 [Name of Company selected by Underwriters].

| | |
|---|---|
| Issuer | A company incorporated in [•]. The Issuer may be certified as a Sharia-compliant company. |
| Issue | US$[?,000,000] [?] % [Sharia Compliant] [Redeemable] Fair Revenue Participation Contract expiring [     ] (the "Issue"). |
| Form and Denomination | Each contractual Unit of FRPC ("Unit") will represent US$10,000 in initial value. Once traded on the REE, the Unit price will reflect investor assessment. They will be issued in registered form. |
| Status | The FRPC will constitute direct and secured obligations of the Issuer. FRPC royalty payments are secured by the transfer of issuer assets to an approved neutral with the issuer retaining the exclusive right to use the asset. |
| Revenue Participation | [     ] % of Revenue for [   ] years expiring [     ]. |
| Revenue | The gross amount received by the Company, its subsidiaries, affiliates and related parties ("Group") for the sale of goods and services in respect of all their commercial activities, as attested by an agreed percentage of the members of the Board of Directors and Senior managers and audited by Approved Auditors. |
| Underwriters/Sponsors | [     ] will research the Issuer and negotiate the terms of the FRPC and underwrite the offering. |
| Information Memorandum | Issuer will work on with Underwriters to prepare and distribute an Information Memorandum on the initial launch of the FRPC where necessary. The information contained in it will include the matters set out in Annex A. The Issuer and Underwriters will take responsibility for the accuracy of all information. |
| Payments | Revenue payments will be made to registered holders of Units on record date, on a quarterly basis. |
| Security | [Description of Assets], being assets of the Group identified by the Underwriters for transfer to the Trustee as security for the due performance by the Issuer of its payment obligations under the FRPC. |
| Repurchase of FRPC | Issuer may repurchase Units by tender or transactions occuring on the REE. All Units repurchased must be cancelled. If more than 80% of the Issue has been repurchased, Issuer may acquire the remaining Units at the highest price purchased by it over the last 12 months. Where terms so state, the issuer may redeem an issue prior to its expiration date. |
| Trustee | An approved licensed trust company will be appointed and compensated by the Issuing Company 50 to protect the interests of FRPC holders 20. |
| Approved Banks | [Name of Banks], being banks approved by the Trustee with which the Issuer has agreed to open banking accounts for all of the Group's revenue deposits
The Banks will be irrevocably authorized (i) to deduct the Specified Percentage over the Specified Term for payment to the Trustee for the FRPC Holders 20 after conversion into the |

-continued

| | |
|---|---|
| | Specified Currency; and (ii) to furnish all information relating to the bank accounts as may be required by the Trustee. |
| Approved Auditors | [       ] to be appointed by the Issuer 50 and approved by the Trustee for the purpose of certifying the amount of Revenue due to the Trustee, on behalf of the FRPC Unit holders. Such certification shall be final and conclusive. |
| Sharia Adviser | [       ] to be appointed by the Issuer and approved (Cont.) by the Trustee for the purpose of certifying that the Issuer continues to be Sharia compliant. |
| Issuer's Undertakings | To include the obligation to remain Sharia compliant, to provide quarterly Revenue attestment, an annual Revenue and Sharia certification and to comply with REE listing rules. |
| Events of Default | As specified in Trust Deed. Upon the happening of an Event of Default, the Issuer shall immediately pay the FRPC Unit holders an amount calculated as follows:-<br>R x SP x Q<br>Where:<br>R is the Revenue in the best performing annual period<br>SP is the Specified Percentage<br>Q is the remaining unexpired term of the SFRPC |
| Significant Transactions | Transactions involving the acquisition or disposal of 20% or more of assets of the Issuer Group require the approval of the Trustee. |
| Governing Law | A governing law and Process Agent will be agreed between the parties. |
| Dispute Resolution | By way of arbitration under the relevant International Arbitration Rules. |
| Listing | The FRPC may be exclusively listed on the Royalty Entitlement Exchange 40 or may be placed and traded by other means. |

2. The Royalty Entitlement Exchange (REX) 40

A salient aspect of the REX 40 is that it is owned and operated by the member ATMs 30, under regulation of the Government Regulating Body (GRB). Subject to GRB approval, the REX 10 will be established as a company incorporated in the locale of the exchange. It will have as ATMs 30 brokering houses and other financial service institutions approved by the GRB. ATMs 30 must also be holders of appropriate broker licenses. Each ATM 30 will be accorded a membership or "seat" on the REX 40, represented by their holding of one ownership share in the REX 40. Each ownership share of the REX 40 shall be accord an equal vote.

It is envisioned that the REX Exchange 40 will incorporate trading of investment products in addition to FRPC units and that only ATMs 30 will be permitted to trade on the REX 40. In this way ATMs 30 will be required to comply with all REX 40 trading rules and by-laws as approved by member ATMs 30 and the GRB. The REX 40 will operate trading and clearing facilities for all products listed and traded on the exchange, inclusive of the FRPCs, and will charge listing and transaction fees. In order to promote the effective and efficient control of risks to FRPC Holders 20 as well as market integrity and financial stability, the exchange may employ a screen-based trading (SBT) system for derivative products. The SBT system will operate with direct access participants from multiple jurisdictions ("cross-border markets") and GRB will adhere to the following additional principles:

The GRB will develop cooperative arrangements and coordinate supervisory responsibilities, consistent with each ATM's 30 responsibilities in a manner that promotes regulatory effectiveness and avoids the imposition of unnecessary regulatory costs. The applicable regulatory requirements in the jurisdiction of the GRB and the ATMs 30 should be transparent. The GRB and all ATMs 30 will share relevant information in an efficient and timely manner, identifying in advance the information needed, the sources of that information, the manner in which the information can be obtained and the channels through which it can be shared. The presently-envisioned information needed for proper operation is detailed below.

Functionally, it has been found that a majority of investors and traders prefer a screen based trading (SBT) system for its transparency and ease of use. As such, this is the platform of choice for the REX 40. There are several screen-based trading applications available on the commercial market, including Microsoft™ software solutions using a Microsoft BackOffice™, platform including Windows NT, SQL Server and MS exchange with a purpose written front end interface. For remote computer stations (operated by the ATMs 30) a conventional host adapter card may be installed in conventional workstations likewise running Windows NT to provide any number of communications ports into the host server. This allows ATM 30 members to trade on their own workstations, irrespective of their location, via a simple dial-up or higher speed connection. This ensures fast trading facilities and real-time information sharing which facilitates effective trading.

3. The Government Regulating Body (GRB)

The GRB will approve a rule set to be observed by FRPC Issuing Companies 50 to ensure prompt disclosure of material information and regulation of related party transactions. These Issuing Companies 50 will also have to submit to director annual audit inspection and, if desired, annual Sharia inspection to maintain certification. The following information will be made available via the exchange platform to all ATM 30 members of the REE 40, and to a lesser extent other non-members of the public:

A. Non-member information:
Name of Issuer 50
Country of primary commercial activity
City of Issuer 50 company headquarters
Brief description of industry
Date and total value of initial FRPC contractual unit issue
Managing underwriter/ATM 30 member of initial offering
Date of last and next expected revenue report
Percentage of FRPC entitlement FRPC period termination date
Date and amount of latest trailing 12 month revenue
Date and amount of latest 3 months revenue
Unit transaction value of 30 days prior
Number and value of FRPC units traded in 30 day period ending 30 days prior
Amount of FRPC paid to single unit holder in latest 12 months
Amount of FRPC paid to single unit holder in latest 90 days
FRPC yield based upon transaction value of 30 days prior and FRPC amount received in latest 12 months
FRPC yield based upon transaction value of 30 days prior and annualized FRPC amount based on latest 90 days
Current best bid for single unit with yield based upon FRPC payment received in last 12 months
Current best offer for single unit with yield based upon FRPC payments received in last 12 months
B. ATM 30 member information:
Name and address of Issuer 50
Contact data for issuing company spokesman
Company provided description of company (summary limited to 3 or 4 pages) with full required; initial, annual and quarterly reports also available online.
Date and total value of initial FRPC contractual unit issue—with full description of terms of contact
Managing underwriter/ATM 30 member of initial offering with contact person at ATM 30 member
Date of last and next expected revenue report—with company and possibly other ATM 30 member projections
Percentage of FRPC entitlement—full terms of contract including description of performance assuring assets
FRPC period termination date—showing amount calculated on basis of trailing 12 months of future FRPC per unit
Date and amount of latest trailing 12 month revenue—showing percentage change from prior 12 month revenue
Date and amount of latest 3 months revenue—showing percentage change from prior 90 days
Unit transaction value of 30 days prior—and full transaction history of price and volume to latest trade
Number and value of units traded in 30 day period ending 30 days prior—full transaction history
Amount of FRPC paid to single unit holder in latest 12 months—with projections for next 12 months, if any
Amount of FRPC paid to single unit holder in latest 90 days—with projections for next 90 days, if any
FRPC yield based upon transaction value of 30 days prior and FRPC amount received in latest 12 months—updated to last trade
FRPC yield based upon transaction value of 30 days prior and annualized FRPC amount based on latest 90 days—updated to last trade
Current best bid for single unit with yield based upon FRPC payments received in last 12 months and ATM 30 member discretionary display of all "open" orders as to amount and size of bid by ATM 30 member as agent or principal
Current best offer for single unit with yield based upon FRPC payments received in last 12 months and ATM 30 member discretionary display of all "open" orders as to amount and size of offer by ATM 30 member as agent or principal It is noteworthy that there may be additional elements of information required to be available from a server. ATM 30 members must be able to input and receive data instantaneously. As noted some of the data is fixed, subject to administration initial and updating input, and some dynamic and transaction based.

It should now be apparent that the present invention provides an investment instrument and exchange platform capable, in many cases, of Sharia-compliant certification and yet which takes full advantage of a selling syndicate, wherein the inclusion of a selling charge into the price of the investment instruments does not upset the relationship between the price of the instruments and their face value. The new FRPC and REE exchange will encourage new capital markets and make it much easier for emerging companies to find growth capital.

Having now fully set forth the preferred embodiment and certain modifications of the concept underlying the present invention, various other embodiments as well as certain variations and modifications of the embodiments herein shown and described will occur to those skilled in the art upon becoming familiar with said underlying concept. It is to be understood, therefore, that the invention may be practiced otherwise than as specifically set forth in the appended claims.

What is claimed is:

1. A method for operating an electronic stock exchange system comprising the steps of:
   establishing a client/server computer system dedicated to screen-based trading (SBT) and comprising a plurality of remote trading-member computer stations in communication with a computer server, an SBT software program running on said computer server, and a graphical user interface displayed by said SBT software on each of said remote trading-member computer stations;
   establishing a government regulating body to regulate said electronic stock exchange system, maintain said computer server, approve trading members for use of said plurality of remote trading-member computer stations, and implement regulations governing said exchange;
   transforming a future cash flow into current equity capital by the substeps of,
      an issuing company contracting one of said approved trading members to be an underwriter to market a fair revenue participation contract (FRPC) investment instrument to individual investors via said electronic stock exchange system,
      said issuing company negotiating terms of offering of said FRPC investment instrument the contracted approved trading member, said negotiated terms including a percentage of future revenue to be paid to said individual investors, a length of time for which the agreed percentage of future revenue will be paid, and an amount of current equity capital to be paid by the individual investors for ownership of each FRPC investment instrument,
      appraising and negotiating critical tangible assets of said issuing company to be pledged as security to a trustee company for due performance of said issuing company's negotiated percentage of future revenue payment obligations under said FRPC investment instrument,
      said issuing company assigning ownership of said appraised and negotiated critical tangible assets to said trustee,
      said trustee granting an exclusive license to use said tangible critical assets back to said issuing company,
      preparing an information memorandum by said contracted approved trading member and electronically distributing said information memorandum to all approved trading members and to prospective FRPC investors over said electronic stock exchange system, procuring investors, by said approved trading members, to purchase said issuing company's underwritten investment instruments whereby said investors become said investment instrument holders, and purchasing by said investment instrument holders of units of said investment instruments; and establishing a secondary market for said FRPC investment instruments by continued trading of said FRPC certificates in script-less form between approved trading members acting on behalf of buying and selling FRPC investment instrument holders over said electronic stock exchange system via their respective of remote trading-member computer stations.

2. A method according to claim 1, wherein said step of negotiating offering of said investment instrument by the approved trading member with said issuing company comprises the substeps of:

agreeing on percentage of revenue to be paid to said investor, mutually by said approved trading member and said issuing company;

agreeing on length of time for which that fixed percentage is to be paid, mutually by said approved trading member and said issuing company; and recommending by said approved trading members, a par value of said investment instrument to be paid by said investor for said investment instrument based on said percentage of revenue to be paid to said investor and said length of time for which that fixed percentage is to be paid.

3. A method according to claim 2, wherein said step of purchasing by said investment instrument holders of units of said investment instruments is followed by the step of trading by said holders of said investments instruments on said exchange platform or said trading platform.

* * * * *